United States Patent [19]

Bergkvist

[11] 4,177,928
[45] Dec. 11, 1979

[54] DEVICE FOR CLEANING WINDSHIELDS, HEADLAMP LENSES, REAR VIEW MIRRORS, REFLECTOR MEANS OR THE LIKE OF A VEHICLE

[76] Inventor: Lars A. Bergkvist, Gottne, 890 26 Moliden, Sweden

[21] Appl. No.: 660,677

[22] Filed: Feb. 23, 1976

[30] Foreign Application Priority Data

Feb. 24, 1975 [SE] Sweden .............................. 7502058

[51] Int. Cl.² .............................................. B05B 1/24
[52] U.S. Cl. .................................. 239/129; 239/284 R
[58] Field of Search ............... 239/129, 130, 136, 137, 239/138, 284

[56] References Cited

U.S. PATENT DOCUMENTS

| | | | |
|---|---|---|---|
| 2,260,904 | 10/1941 | Horton | 239/130 |
| 2,576,198 | 11/1951 | Stuart | 239/130 X |
| 2,632,672 | 3/1953 | Waterman | 239/137 X |
| 2,638,383 | 5/1953 | Hall | 239/137 |
| 3,756,510 | 9/1973 | Nitterl | 239/129 |

Primary Examiner—John J. Love

Attorney, Agent, or Firm—Strauch, Nolan, Neale, Nies & Kurz

[57] ABSTRACT

A device or system for cleaning windshields, headlamp lenses, rear view mirrors, reflector means, or the like of a vehicle. The system is installed in the vehicle, preferably in the engine compartment, and includes a liquid container, a conduit from the container to a steam generator, including a pump and a stop valve downstream of the pump to prevent return flow of liquid from the steam generator to the container. Engine exhaust heat or an electric heater is used for heating the steam generator, and an outlet conduit with nozzles direct steam from the generator to the vehicle parts to be cleaned. The system has a shunt conduit from the liquid supply bypassing the steam generator and connected to the outlet conduit downstream of the steam generator and steam from the generator mixes with the liquid from the shunt conduit and the mixture advances and flows out to the vehicle part or parts to be cleaned. The shunt line can be passed through a heat accumulator or exchanger to transfer engine exhaust heat to the shunted liquid. If desired, auxiliary cleaning lines can be tapped off of the shunt line to provide hot cleaning liquid not mixed with steam for selected parts of the vehicle.

8 Claims, 2 Drawing Figures

DEVICE FOR CLEANING WINDSHIELDS, HEADLAMP LENSES, REAR VIEW MIRRORS, REFLECTOR MEANS OR THE LIKE OF A VEHICLE

BACKGROUND OF THE INVENTION

This invention relates to a device for cleaning windshields, headlamp lenses, rear view mirrors, reflector means or the like of a vehicle.

A device for said purposes is previously known, which comprises in combination a liquid container, a conduit for passing liquid from the liquid container to a steam generator, a pump for advancing liquid in the conduit, a stop valve for preventing return flow of liquid from the steam generator to the container, a means for heating the steam generator and a means for passing steam from the steam generator to the vehicle part or parts to be cleaned. The said device, however, requires a substantial amount of steam to be ejected in order to bring about an efficient cleaning of the vehicle part in question, the more so because said part most often is covered with solid dirt particles, which are difficult to remove, and also because it is in motion, so that part of the steam escapes without carrying out its function.

The aforesaid inconveniencies are overcome by a construction according to the present invention, at which a device with the aforesaid design comprises in addition a shunt conduit for liquid supply which extends on the side of the steam generator and is connected to the device after the steam generator, so that steam from the generator meets the liquid coming from the shunt conduit and acts to advance the liquid and mixed therewith flows out to the vehicle part or parts to be cleaned.

BRIEF DESCRIPTION OF DRAWING

Some embodiments of the invention are described in greater detail in the following by way of example, with reference to the accompanying drawing, in which.

Analogous details in the two Figures of the drawing are designated by the same reference numerals.

DESCRIPTION OF PREFERRED EMBODIMENT

Figure 1:
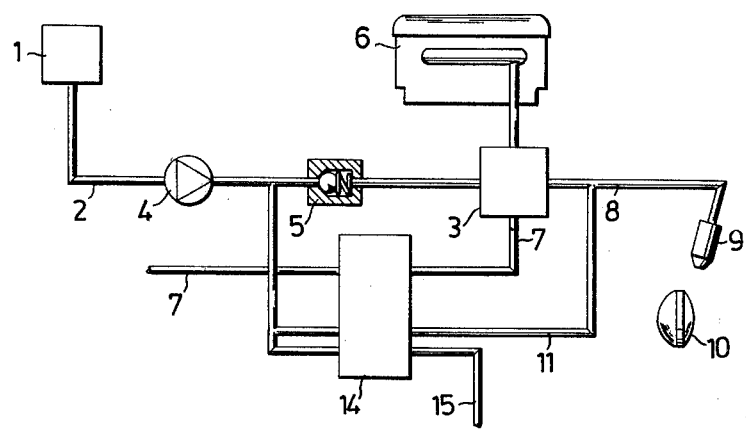
FIG. 1 illustrates in a highly schematic manner a device according to a first embodiment of the invention, and FIG. 2 also schematically illustrates a device according to a second alternative embodiment.

In FIG. 1 the numeral 1 designates a liquid container, which is positioned in the vehicle in a place suited for comfortable refill, for example in the engine space. The liquid in the container most preferably is water, possible mixed with an agent for lowering the freezing point. From said container 1 a conduit 2 extends to a steam generator 3 of a design adapted for the purpose. For conveying liquid from the container 1 to the steam generator 3, a pump 4 is provided along the conduit 2. The pump operation can manually be controlled from the instrument board of the vehicle or be foot-controlled. Between the pump and the steam generator a stop (check) valve 5 is provided, the object of which is to prevent return flow of liquid and/or steam from the generator and, in the case of the pressure in the generator exceeding the pump pressure in the conduit, to shut off the supply of liquid from the container 1 to the generator 3. When the pump does not operate, the steam generator is empty of liquid.

At the embodiment shown in FIG. 1, the steam generator 3 in a manner arbitrary per se is connected to the exhaust system or exhaust pipe 7 extending from the engine 6 of the vehicle for heating the same. The connection of the steam generator to the exhaust system, for example, can be realized in such a manner, that the generator or generator housing is built about the exhaust pipe 7, or that it is positioned within the exhaust pipe in order there to be circumcirculated by waste gases passing through the pipe. It can also be imagined to connect the steam generator directly to the engine and its parts of the exhaust system.

One or more conduits 8 are connected to the steam generator 3 and open into one and, respectively, several nozzles 9 disposed at or near the headlamp lenses 10 of the vehicle. Instead of headlamps, also other vehicle parts to be cleaned can be concerned, for example windshields, rear view mirrors, reflector means and the like.

According to the invention, a shunt conduit 11 is connected with one end to the conduit 2 in a place between the pump 4 and the stop valve 5 and with its other end to the conduit or conduits 8 after the steam generator 3.

The shunt conduit 11 extends via a heat accumulator 14, which heats the liquid being pumped into the shunt conduit 11 from the liquid container 1. The heat accumulator imparts to the liquid flowing in the conduits 8 out from the shunt conduit 11 such a temperature, that condensation of the steam produced by the steam generator 3 substantially is prevented. The heat accumulator 14 consists of a solid body, which is heated by the exhaust gases of the engine 6 and, thus, serves as heat accumulator. Said heat accumular 14 can in a suitable way be mounted either within or on the outside of an exhaust pipe or branch pipe, or be integral therewith. In the heat accumulator a plurality of narrow passages connected in parallel to each other can be arranged, in which passages the liquid flows and is heated.

The device described above operates as follows. When the vehicle part 10 in question is to be cleaned, the pump 4 is started, whereby liquid from the container 1 is pumped via the conduit 2 through the stop valve 5 to the steam generator 3 where the liquid is heated by heat from the exhaust system 7 and transforms to steam. Hereby the pressure in the steam generator rises, and at the moment when the pressure in the generator exceeds the pump pressure the stop valve 5 closes, whereby the liquid supply to the generator is interrupted. The produced steam flows out in the conduit 8. In connection with the starting of the pump and its pumping of liquid to the generator, liquid was also pumped into the shunt conduit 11 and further through the heat accumulator 14, whereafter the liquid enters into the conduit 8 where it is met by the advancing steam, which then acts as a pushing force on the liquid. The mixture of steam and liquid is then sprayed out of the nozzle 9 in question to flush the glass on the vehicle part 10 and efficiently cleaning the same.

Figure 2:
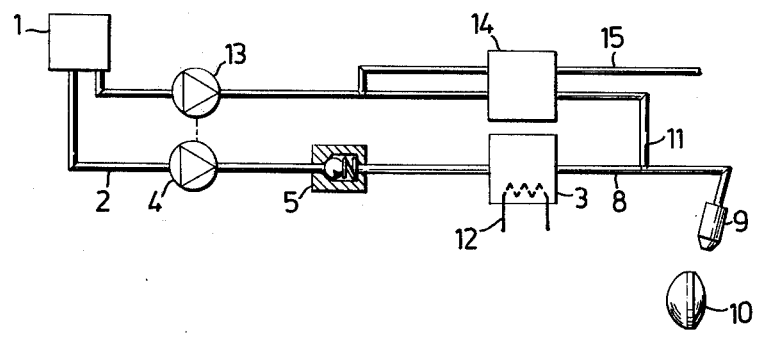

In FIG. 2 an embodiment is illustrated, at which the steam generator 3 is heated electrically. For this purpose, an electric heating element 12, for example of immersion heater type, is connected to the generator 3 in an arbitrary way. The shunt conduit 11, as in FIG. 1, is connected with one end of the conduit 8, but with its other end to the container 1 and is provided with a heat accumulator 14 and a pump 13, which for its operation possibly may be connectible to the pump 4 (indicated by a dash-dotted line). The function of this device is substantially the same as that of the device shown in FIG. 1. The shunt conduit 11 in FIG. 2, however, could be positioned as in FIG. 1 and, thus, the pump 13 be abandoned.

It is also possible to connect via the heat accumulator 14 an additional conduit 15, the object of which is to heat water for cleaning a part, which is not cleaned with steam and liquid by the device described above. The heat accumulator 14 in this case comprises two separate systems of small passages, one for the shunt conduit 11 and one for said additional conduit. Even more than two systems can be arranged in the heat accumulator 14.

The headlamps of a car, for example, can be cleaned by liquid and steam in the afore-described way, while the windshield is cleaned by a liquid heated by a second system of passages arranged in the heat accumulator.

At a highly simplified embodiment only the heat accumulator can be used for heating washing liquid for the headlamp wipers operated mechanically.

The invention, of course, is not restricted only to the embodiments described and shown in the drawing, but can be modified within the scope of the invention. The heating of the steam generator, for example, can be effected in a way other than those described, and possibly these ways can be combined. The conduits 2 and 11 can have adjustable flow, and they may be connected to separate liquid containers or chambers. The chamber for the conduit 2, for example, may contain pure water, and the chamber for the conduit 11 may contain water mixed with a cleaning agent and/or an agent lowering the freezing point.

I claim:

1. A system to be installed in vehicles for cleaning windshields, headlamp lenses, rear view mirrors, reflector means or the like of the vehicle, comprising: liquid container means; a steam generator having heating means adapted to be connected to an energy source in the vehicle; conduit means, including pump means having at least one pump connected between the liquid container means and said steam generator for advancing liquid in the conduit means from the container means, and said conduit means including a check valve downstream of said pump to prevent return flow of liquid from the steam generator to the container means; outlet conduit means connected to said steam generator for passing steam from the steam generator to the vehicle parts to be cleaned; shunt conduit means from said first mentioned conduit means by-passing said steam generator and having a connection to the outlet conduit means so that steam from the generator meets and intermixes with liquid from the shunt conduit and advances the mixture to the vehicle part or parts to be cleaned.

2. A system according to claim 1, wherein: said shunt conduit means connects to said first mentioned conduit means between said pump and said check valve.

3. A system according to claim 1, wherein: said first mentioned conduit means include two parallel conduits from the liquid container means, one of said parallel conduits connecting to the inlet of said pump; and said shunt conduit means includes, at its upstream side, the second of said parallel conduits and a second pump.

4. A system according to claim 1, wherein said shunt conduit means further includes a heat exchanger with heating means adapted to be connected to a heat energy source in the vehicle for pre-heating the liquid which passes through said shunt conduit means.

5. A system according to claim 4, characterized in that the heat exchanger consists of a heat accumulating solid body adapted to cooperate with and absorb heat from the exhaust system of the engine, said solid body having a plurality of narrow passages intended for liquid flow through said shunt conduit means.

6. A system according to claim 5, characterized in that said heat exchanger comprises a plurality of independent systems of passages for heating liquid with outlets for a plurality of places to be cleaned.

7. A system according to claim 1, wherein said steam generator heating means is an electric heater adapted to receive heat energy from the vehicle electrical system.

8. A system according to claim 1, wherein said steam generator heating means constitutes a heat exchange means adapted to structurally connect with the vehicle exhaust system.

* * * * *